United States Patent
Becker et al.

(10) Patent No.: US 10,169,603 B2
(45) Date of Patent: Jan. 1, 2019

(54) REAL-TIME DATA LEAKAGE PREVENTION AND REPORTING

(71) Applicant: International Business Machines Corporation, Armonk, NY (US)

(72) Inventors: Shlomit Becker, Beit Shemesh (IL); Boris Melamed, Efrat (IL); Alexander Pyasik, Maaleh-Adumim (IL); Shani Turgeman, Elazar (IL); Gidi Weber, Jerusalem (IL); Yifat Yulevich, Bazra (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 359 days.

(21) Appl. No.: 15/071,347

(22) Filed: Mar. 16, 2016

(65) Prior Publication Data

US 2017/0270310 A1 Sep. 21, 2017

(51) Int. Cl.
*G06F 21/62* (2013.01)
*G06F 9/445* (2018.01)
*G06F 17/30* (2006.01)

(52) U.S. Cl.
CPC .......... *G06F 21/6218* (2013.01); *G06F 9/445* (2013.01); *G06F 17/30563* (2013.01)

(58) Field of Classification Search
CPC . G06F 21/6218; G06F 17/30563; G06F 9/445
See application file for complete search history.

(56) References Cited

U.S. PATENT DOCUMENTS

| 8,438,630 B1 | 5/2013 | Clifford |
| 8,789,181 B2 | 7/2014 | Blackwell |

(Continued)

FOREIGN PATENT DOCUMENTS

| CN | 103177007 A | 6/2013 |
| WO | 2012109533 A1 | 8/2012 |

OTHER PUBLICATIONS

Balinsky et al., "System Call Interception Framework for Data Leak Prevention", 2011 15th IEEE International Enterprise Distributed Object Computing Conferene 2011, 10 pages.

(Continued)

*Primary Examiner* — Baotran N To
(74) *Attorney, Agent, or Firm* — Cantor Colburn LLP; Robert Bunker

(57) ABSTRACT

Aspects include detecting that an extract transform load (ETL) job in an ETL system has been submitted for execution. The ETL job can include an input data storage location and an output data storage location. The ETL job is analyzed to predict whether execution of the ETL job will result in sensitive information being made accessible to an unauthorized user. The analyzing can be based on a sensitivity status of contents of the input data storage location and a data lineage of contents of the output data storage location. The ETL job is prevented from executing based on predicting that execution of the ETL job will result in sensitive information being made accessible to an unauthorized user. Execution of the ETL job is initiated based on predicting that execution of the ETL job will not result in sensitive information being made accessible to an unauthorized user.

18 Claims, 7 Drawing Sheets

(56) References Cited

U.S. PATENT DOCUMENTS

| | | | |
|---|---|---|---|
| 8,881,019 B2 | 11/2014 | Gupta et al. | |
| 8,893,280 B2 | 11/2014 | Jung et al. | |
| 8,893,300 B2 | 11/2014 | Ramachandran et al. | |
| 2006/0272024 A1 | 11/2006 | Huang et al. | |
| 2010/0212010 A1* | 8/2010 | Stringer | G06F 21/52 |
| | | | 726/22 |
| 2010/0251369 A1* | 9/2010 | Grant | G06F 21/554 |
| | | | 726/23 |
| 2012/0210388 A1* | 8/2012 | Kolishchak | G06F 21/552 |
| | | | 726/1 |
| 2012/0266255 A1* | 10/2012 | Gupta | G06F 17/30563 |
| | | | 726/26 |
| 2014/0230066 A1 | 8/2014 | Hurwitz et al. | |

OTHER PUBLICATIONS

David Zhu et al., "TaintEraser: Protecting Sensitive Data Leaks Using Application-Level Taint Tracking", Intel Labs Seattle, 2011, 14 pages.

Jakub Riha, "Static Taint Analysis for Detecting Security Vulnerabilities", 2010, 4 pages.

Wuchner et al., "Data Loss Prevention based on data-driven Usage Control" Software Reliability Engineering (ISSRE), 2012 IEEE 23rd International Symposium, Nov. 2012, 11 pages.

Yoshihama et al., "Web-based Data Leakage Prevention", Yokohama National University, Conference: Advances in Information and Computer Security—5th International Workshop on Security, IWSEC 2010, Kobe, Japan, Nov. 22-24, 2010, 16 pages.

\* cited by examiner

REAL-TIME DATA LEAKAGE PREVENTION AND REPORTING

BACKGROUND

The present invention relates generally to preventing leakage of sensitive data and, more specifically, to performing real-time data leakage prevention and reporting for computer systems that perform extract transform load (ETL) jobs.

ETL systems are used to move data from one database (or file) to another, to form data marts and data warehouses, and also to convert databases (or files) from one format or type to another. ETL refers to the process of extracting data from one data location, transforming the extracted data into a format for a target data location, and loading the transformed data into a target data location. ETL systems are used to integrate data from multiple applications (systems) that are typically developed and supported by different vendors or hosted on separate computer hardware. The disparate systems containing the original data are frequently managed and operated by different employees and/or different entities. For example, a cost accounting system may combine data from data source locations such as payroll, sales, and purchasing systems. The transformation of the data occurs using predefined rules or lookup tables and/or by combining the data with other data.

SUMMARY

Embodiments include a method, system, and computer program product for detecting, by an analysis engine, that an extract transform load (ETL) job in an ETL system has been submitted for execution. The ETL job can include an input data storage location and an output data storage location. The ETL job is analyzed, by the analysis engine, to predict whether execution of the ETL job will result in sensitive information being made accessible to an unauthorized user. The analyzing can be based on a sensitivity status of contents of the input data storage location and a data lineage of contents of the output data storage location. The ETL job is prevented, by the analysis engine, from executing based on predicting that execution of the ETL job will result in sensitive information being made accessible to an unauthorized user. Execution of the ETL job is initiated based on predicting that execution of the ETL job will not result in sensitive information being made accessible to an unauthorized user.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Figure 1:
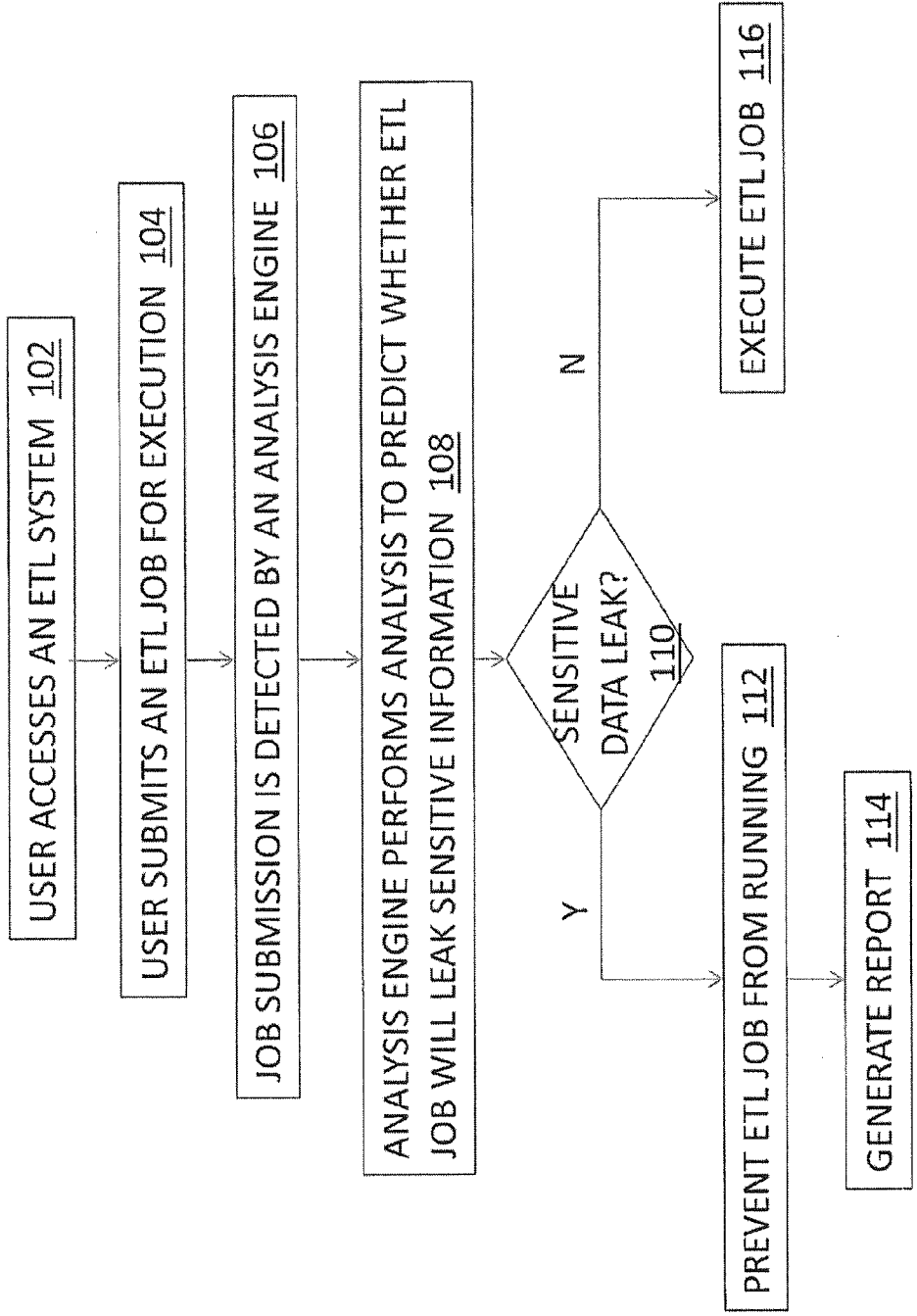
FIG. 1 depicts a process flow for performing real-time data leakage prevention and reporting, according to some embodiments of this disclosure.

Embodiments of the present disclosure can be utilized to prevent sensitive data that is stored in a computer from being accessed by unauthorized users. Embodiments utilize real-time sensitive source data alerts generated by database activity monitoring (DAM) and file activity monitoring (FAM) systems to identify sensitive data, as well as data lineage reports that can be generated based on predictive, historical, and planned data flow to predict whether the running of a particular ETL job will lead to leakage of sensitive information. Embodiments can also provide detailed reports that identify the location and causes of potential sensitive data leaks.

As used herein, the term "sensitive data" or "sensitive information" refers to data where access is restricted to particular users. The particular users can be authorized based, for example, on their job description or other characteristics. Embodiments described herein can prevent sensitive data or information from being loaded into a public database or other location where unauthorized users can access it. That is, embodiments described herein can prevent "leaks" or "leakage" of the sensitive data or information. Data can be described as having a "sensitivity status", where data that is sensitive has a sensitivity status of "sensitive" and data that is not sensitive has a sensitivity status of "not sensitive."

As used herein, the term "ETL system" refers to a group of ETL jobs. A data flow can be generated to trace data through the ETL jobs in the ETL system. An ETL project can include a subset of the ETL jobs in an ETL system that will be executed in a specified order at a planned time, after a particular event, and/or at a planned interval (e.g., every Tuesday at 8:30 a.m. or every Tuesday after "job x" has successfully completed execution).

In an embodiment, a user submits an ETL job to be run. Before the job is actually executed, an analysis is performed (e.g., by an analysis engine) to determine if the anticipated behavior of the ETL job leads to any leakage of sensitive data down the line. If the analysis engine concludes that there is the potential that sensitive data will be leaked to an unauthorized location or user, then embodiments can prevent the ETL job from running. Otherwise, execution of the ETL job proceeds. The analysis engine can use data linage reports for predicting whether running an ETL job will result in a data leakage.

The term "data lineage" as used herein refers to a data life cycle that includes the data's origins, where it moves over time, and what happens to the data as it is transformed. Data lineage tools, such as InfoSphere® from IBM, can help to provide visibility into the analytics pipeline and simplify tracing errors back to their sources. Data lineage tools can provide a visual representation to discover the data flow/movement from its source to destination via various changes and hops on its way in the enterprise environment.

Embodiments of the analysis engine described herein provide annotated data lineage reports with clear information about where the sensitive data leak(s) happens. To this end, embodiments can overlay data lineage reports with information about which data sources contain sensitive data. A user can then view such a report and easily identify the sensitive data sources and flows that lead to the potential leakage, and can then choose to fix or remove them, and then resubmit the ETL job for execution.

Data lineage displays the data flows in ETL jobs. ETL projects can contain many jobs and each of these jobs may contain any number of flows. Each flow reads data from one or more sources, manipulates the data, and then loads/writes the results to one or more target locations. Data lineage is an important utility when developing ETL projects because it helps to verify aspects of the data as the data moves along between locations. One such aspect is data sensitivity (e.g., is access to the data restricted to particular users), which can be important to ensure that data leakage does not occur as a result of running the ETL job. The term "data leakage prevention" or "DLP" refers to a strategy to make sure that sensitive information is not leaked to publicly accessible areas, such as a public cloud.

In large ETL projects that change frequently and involve hundreds or even thousands of jobs and data sources, manual detection of sensitive data leakage can be complicated or even not feasible. ETL job flows often have many branches that cause data to flow in different directions, and each of these continuing flows may or may not end up in a public domain.

Embodiments described herein provide a data flow analysis engine that intercepts a submitted ETL job. The data flow analysis engine can be implemented in hardware, firmware, software, or any combination thereof. Before allowing the ETL job to execute, the data flow analysis engine determines whether or not executing the ETL job will result in data leakage. Embodiments can examine all of the flows recursively, which includes checking the flow of data in each branch, following it from the beginning (where it came from) to the end (where it is predicted to move to).

If potential sensitive data leaks are found, the analysis engine can alert the user and can also automatically prevent the flow of sensitive data into a public domain. In an embodiment, a mechanism is provided to help the user clarify what is needed to remedy the flow so that the ETL job will be allowed to run in the future.

Referring now to FIG. 1, a process flow for performing real-time data leakage prevention and reporting for ETL job is generally shown in accordance with an embodiment. The process flow shown in FIG. 1 can be performed by an analysis engine executing on a computer processor. At block 102 a user accesses an ETL system, such as, but not limited to InfoSphere DataStage® from IBM, and at block 104 the user submits an ETL job (includes computer instructions for carrying out an ETL operation) for execution. An ETL job can specify input data that is located in an input(s) data source (e.g., a file or database), a transformation or conversion to be applied to the specified input data, and an output location (s) (e.g., a file or database) for the converted data. At block 106, the submission of the ETL job is detected by an analysis engine and, before the ETL job is actually run, an analysis is performed at block 108 to determine whether executing the ETL job will cause leakage of sensitive data. In an embodiment, this analysis is based on real-time sensitive source data alerts which indicate any portions of the specified input data that contain sensitive data, and on data lineage reports that indicate a flow of data associated with the ETL job.

In an embodiment, real-time sensitive data alerts can be generated by database activity monitoring (DAM) and file activity monitoring (FAM) systems. These alerts can be generated, for example by a security system, such as Guardium® from IBM. DAM is a database security technology for monitoring and analyzing database activity that operates independently of the database management system (DBMS), and is typically performed continuously and in real-time. A FAM system is used to identify sensitive data that is stored in files and can include: discovery to inventory files and metadata; classification to crawl through the files to look for potentially sensitive data (e.g., credit card information or personally identifiable information); and monitoring access to files. Alerts generated by DAM and FAM systems can be used by embodiments to inform the analysis engine about data sources that contain sensitive information.

In embodiments, alerts are generated by DAM and/or FAM systems in real-time to account for changes in data sensitivity due, for example, to passing a particular date or to insertion of sensitive data or another event that causes the sensitivity of the data to change. In an embodiment, the sensitivity status of data used by a currently executing ETL job may change from "not sensitive" to "sensitive." In response to the change in sensitivity status, the DAM and/or FAM can send a sensitivity status change alert in real-time to the analysis engine which can cancel, or halt, the execution of the ETL job to prevent leakage of sensitive information. In embodiments data lineage is overlaid with static sensitivity information. In other embodiments, alerts are generated in real-time and utilize static sensitivity information.

Embodiments can provide predictive reporting to correlate between the real-time sensitive data alerts and an expected data flow, as provided by data lineage reports. Embodiments can utilize a graphing algorithm (e.g., breadth-first search or depth-first search) which finds the path between two nodes (each node representing data locations) in a graph. The analysis allows the system to determine how any of the sensitive data flows in the graph from one data location to another.

In an embodiment, the data lineage graphs are based on the following types of knowledge about data flow: planned data flow; design-time data flow; and operational (run-time) data flow. Planned data flow is how an ETL planner intended the ETL job to behave. The planned data flow can be specified, for example, in InfoSphere Blueprint Director from IBM or in Excel spreadsheets. Design-time data flow is extracted from actual job design metadata and it predicts what an ETL job will do if it is executed with default settings. Operational (run-time) data flow is taken from operational metadata produced in previous ETL job runs.

If it is determined at block 110 that the result of the analysis is that the predicted behavior of the examined ETL job will lead to ultimate leakage of sensitive data down the line, then block 112 is performed and the ETL job is prevented from executing. At block 114, the analysis engine can provide the users with an enriched data lineage report that indicates flows of sensitive data within the overall data flow graph. Users can then proceed to fix the problematic areas or remove sensitive data sources, and then re-submit the ETL job for execution.

If it is determined at block 110 that the result of the analysis is that the predicted behavior of the examined ETL job will not lead to leakage of sensitive data, then block 116 is performed and the ETL job is executed.

An example of implementing the processing shown in FIG. 1 is shown below in reference to FIGS. 2-4.

Figure 2:
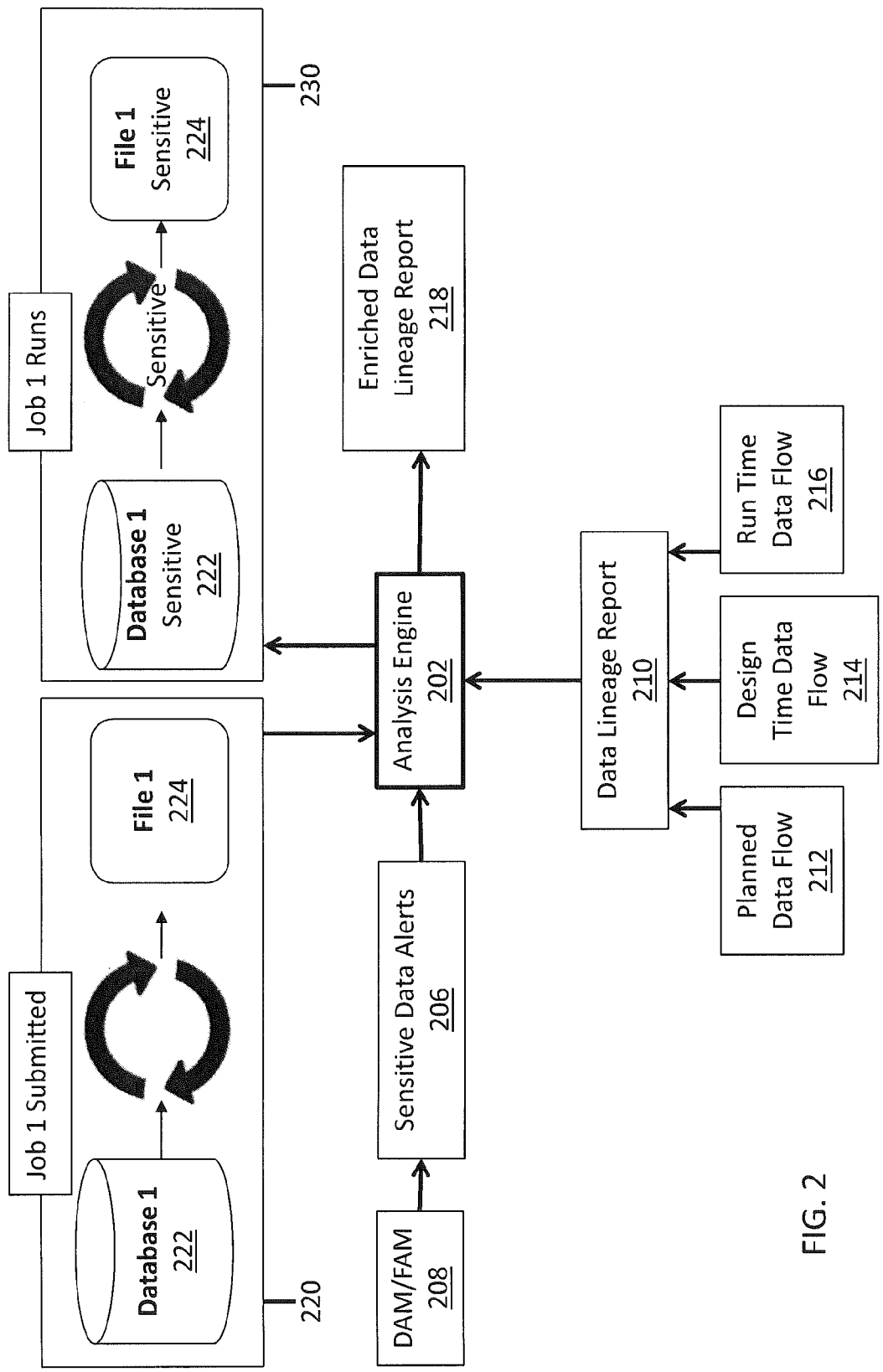
FIG. 2 depicts a block diagram of components upon which real-time data leakage prevention and reporting is performed, according to some embodiments of this disclosure.

Turning now to FIG. 2, a block diagram of components upon which real-time data leakage prevention and reporting for ETL jobs is performed is generally shown in accordance with an embodiment. FIG. 2 depicts ETL Job 1 being submitted at block 220. As shown in FIG. 2, Job 1 extracts data from Database 1 222 and stores the data (e.g., after the data is transformed) into File 1 224. Before ETL Job 1 is executed, an analysis engine 202 intercepts Job 1 and performs analysis to determine whether it should be permitted to be executed. As described above, the analysis engine 202 receives real-time sensitive data alerts 206 from DAM/FAM systems (in this example, a DAM system) that indicate whether Database 1 222 (the input to Job 1) contains sensitive data. The data alerts 206 can indicate that the entire contents of Database 1 222 contain sensitive data or they can specify a particular subset of the data in Database 1 222 as containing sensitive data.

A data lineage report 210 is also input to the analysis engine 202. As described previously, the data lineage report 210 is generated based on one or more of a planned data flow 212, a design time data flow 214, and a run-time data flow 216. The data lineage report 210 traces the data in Database 1 222 and File 1 224 as they flow through the ETL jobs in the ETL system.

In embodiments, the analysis engine 202 overlays the data lineage report 210 with indications of which data is sensitive from the sensitive data alerts 206, in order to generate an enriched data lineage report 218 which can be output to a user. In an embodiment, the enriched data lineage report 218 includes detailed information about why the submitted ETL job is or is not permitted to be executed. The enriched data lineage report 218 can include a graphical display of the data flows between data sources and processes and a flat list of all reached data sources, along with indications about sensitivity. Problematic flows can be emphasized by line color or thickness. Sensitive data sources can be emphasized by color or bold font. Information in the enriched data lineage report 218 can be used by users to fix the problematic areas or to remove the sensitive data sources.

As shown in FIG. 2, the analysis engine determines that Database 1 222 contains sensitive data and that the data output to File 1 224 also contains sensitive data. As shown in FIG. 2, block 220 represents the request and block 230 represents the analysis of what would happened if the request was granted. In an embodiment, the analysis is on the granularity level of tables or columns.

As shown in FIG. 2, the analysis engine 202 determines that ETL Job 1 which was submitted at block 220 is permitted to be executed even though sensitive data is written to File 1 224, because for example, the data lineage report 210 indicates that the contents of File 1 224 are not predicted to leave the private domain. FIG. 2 shows ETL Job 1 executing at block 230.

Figure 3:
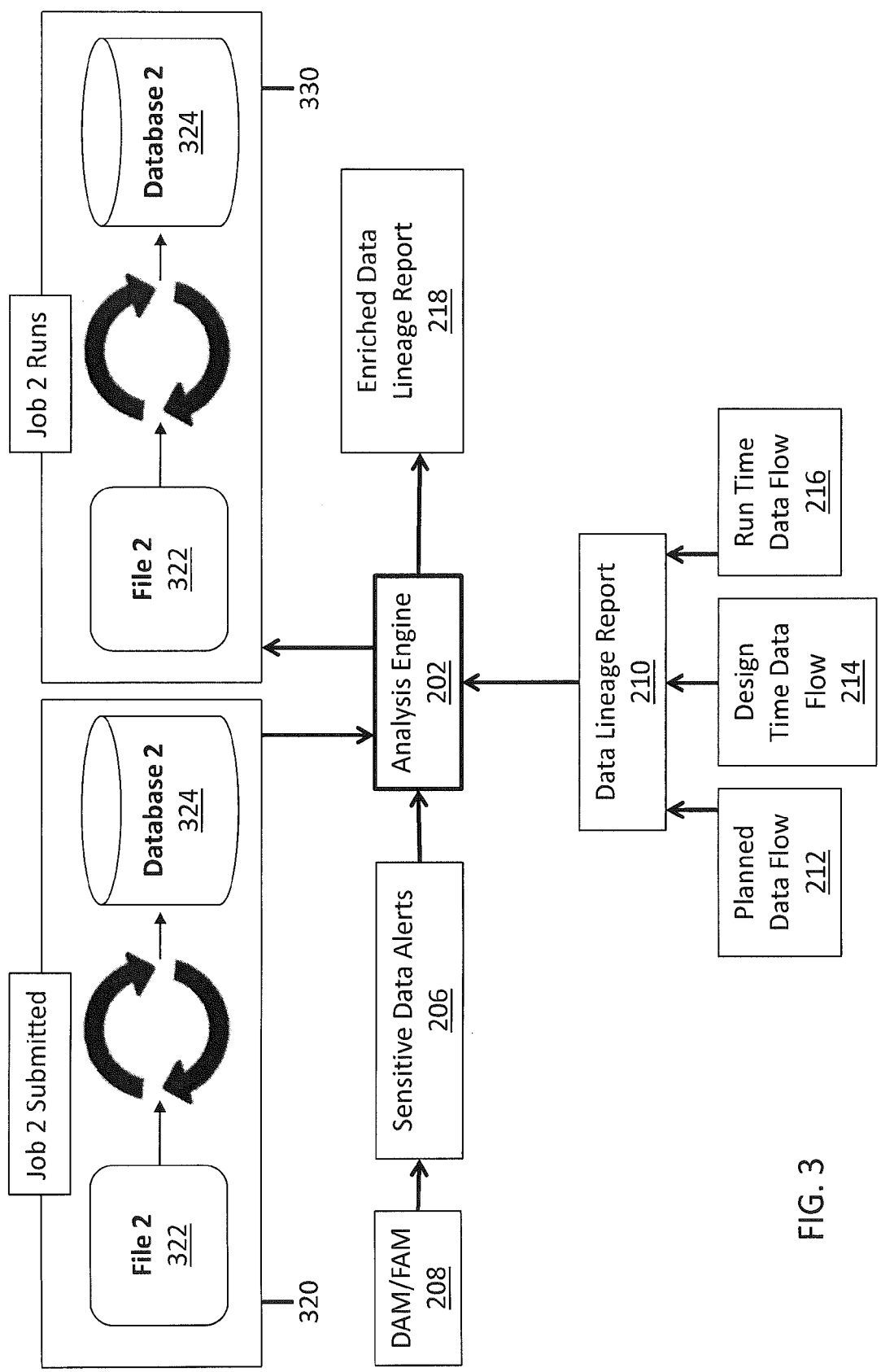
FIG. 3 depicts a block diagram of components upon which real-time data leakage prevention and reporting is performed, according to some embodiments of this disclosure.

Turning now to FIG. 3, a block diagram of components upon which real-time data leakage prevention and reporting for ETL jobs is performed is generally shown in accordance with an embodiment. FIG. 3 depicts ETL Job 2 being submitted at block 320. ETL Job 2 extracts data from File 2 322 and stores the data (e.g., after the data is transformed) into Database 2 234 which is located in the public domain. Before ETL Job 2 is executed, the analysis engine 202 intercepts the submitted ETL Job 2 and performs analysis to determine whether it should be permitted to be executed. As described above, input to the analysis engine 202 includes sensitive data alerts 206 and a data lineage report 210. As shown in FIG. 3, the analysis engine 202 determines that File 2 322 does not contain sensitive information and that Database 2 324 does not contain sensitive data. The analysis engine 202 determines that ETL Job 2 is permitted to be executed even though Database 2 324 is in the public domain because the execution will not cause sensitive information to be transferred to Database 2 324. FIG. 3 shows ETL Job 2 executing at block 330.

Figure 4:
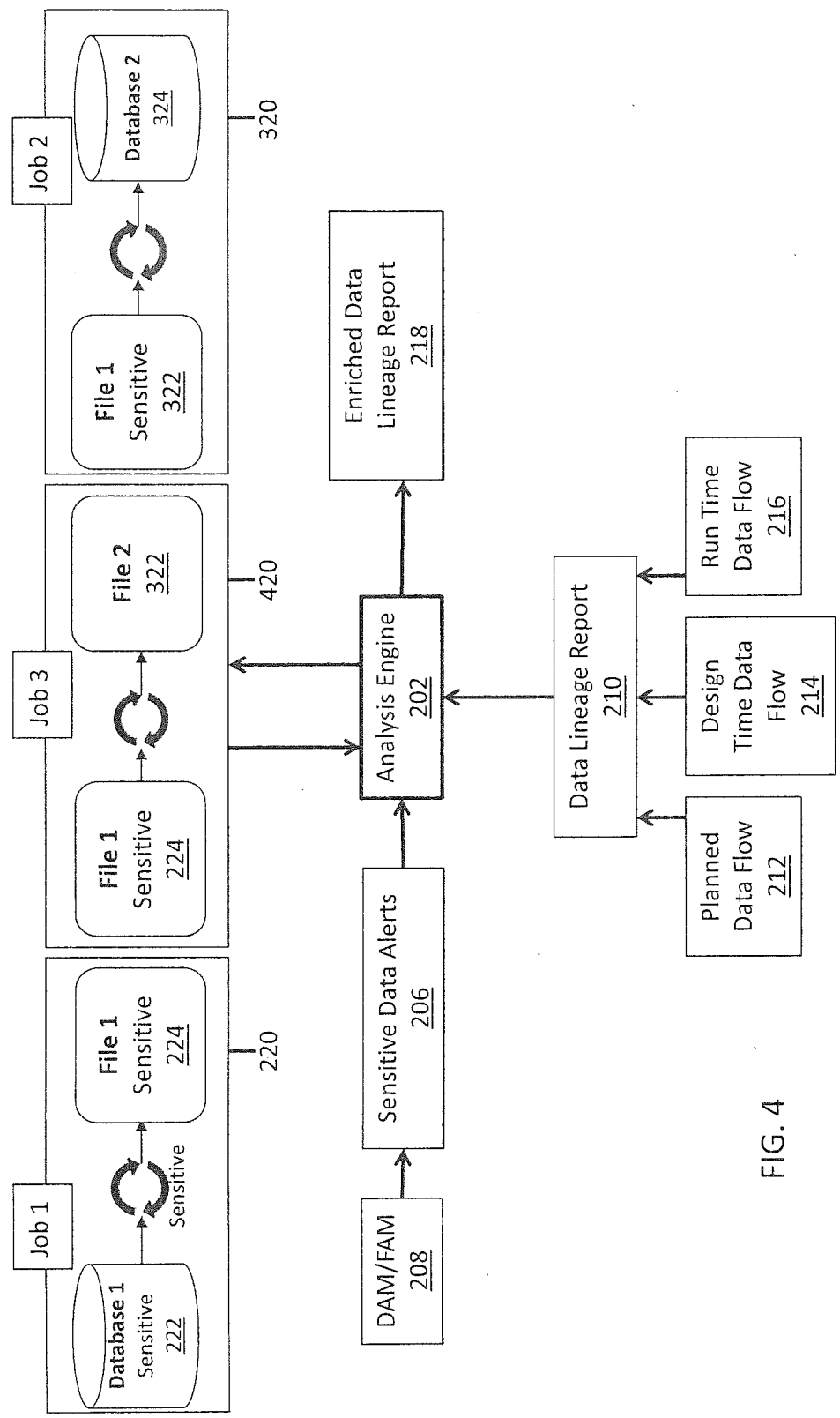
FIG. 4 depicts a block diagram of components upon which real-time data leakage prevention and reporting is performed, according to some embodiments of this disclosure.

Turning now to FIG. 4, a block diagram of components upon which real-time data leakage prevention and reporting for ETL jobs is performed is generally shown in accordance with an embodiment. FIG. 4 depicts ETL Job 1 from FIG. 2 (where both Database 1 222 and File 1 224 contain sensitive data) and ETL Job 2 from FIG. 3 (where neither File 2 322 nor Database 2 324 which is the public domain contains sensitive data). In addition, FIG. 4 depicts ETL Job 3 that is shown in block 420. ETL Job 3 extracts data from File 1 224 (which has sensitive data) and stores the data (e.g., after the data is transformed) into File 2 322 (which previously did not have sensitive data). As shown in FIG. 4, the ETL system or project has linked these three ETL jobs for execution: Job 1 followed by Job 3 which is followed by Job 2.

Before Job 1 is executed (or as part of creating ETL job flow in an ETL system), the analysis engine 202 intercepts the submitted ETL job and performs analysis to determine whether it should be permitted to be executed. As described above, input to the analysis engine 202 includes real-time sensitive data alerts 206 and a data lineage report 210. In an embodiment, the analysis engine 202 determines that the Job 1 is not permitted to execute since its execution will cause sensitive data from Database 1 222 to flow to Database 2 324 (which is in the public domain).

In an embodiment, the analysis engine 202 may determine that two or more sources of data that are not sensitive, when combined create sensitive data. For example, data in a file that is not sensitive may include patient information such as patient identifier, name, address, and age. Data in another file that is not sensitive may include medical records such as patient identifier and medical condition. When the data is combined, sensitive data such as a patient name and associated medical condition can be derived. In an embodiment, the analysis engine 202 will prevent an ETL job with input that when combine creates sensitive data from running to prevent the leakage of sensitive data.

Figure 5:
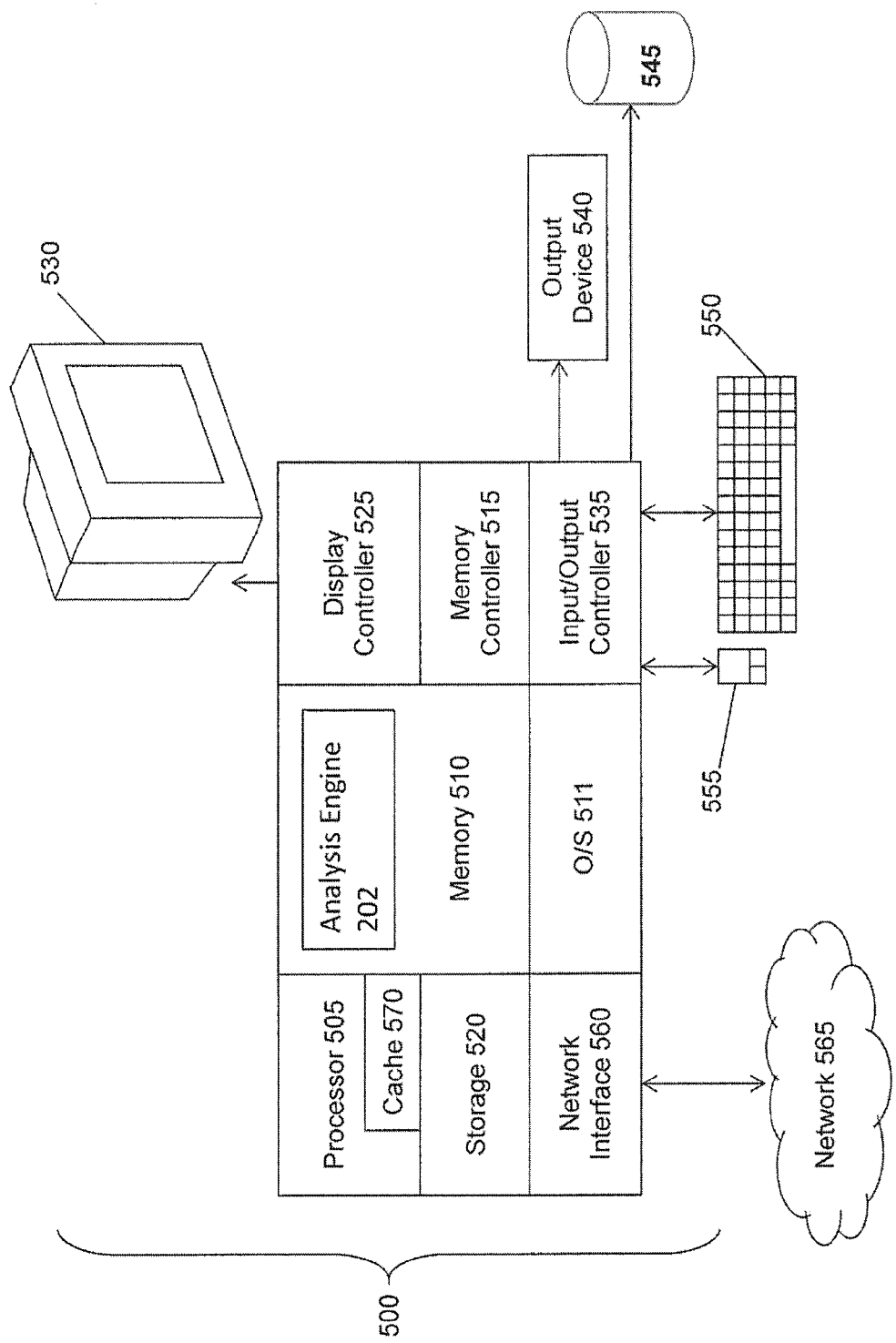
FIG. 5 depicts a block diagram of a computing device for implementing some or all aspects of the system, according to some embodiments of this disclosure.

Turning now to FIG. 5, a block diagram of a computing device for implementing some or all aspects of the system is generally shown in accordance with an embodiment. FIG. 5 illustrates a block diagram of a computing device 500 for use in implementing a system or method according to some embodiments. The systems and methods described herein may be implemented in hardware, software (e.g., firmware), or a combination thereof. In some embodiments, the methods described may be implemented, at least in part, in hardware and may be part of the microprocessor of a special or general-purpose computing device 500, such as a cellular phone, a personal digital assistant (PDA), tablet computer, personal computer, workstation, minicomputer, or mainframe computer for example.

In some embodiments, as shown in FIG. 5, the computing device 500 includes a processor 505, memory 510 coupled to a memory controller 515, and one or more input devices 545, and output devices 540, which are communicatively coupled via a local I/O controller 535. These devices 540, 545 may include, for example, a printer, a scanner, a microphone, and the like. Input devices such as a conventional keyboard 550 and mouse 555 may be coupled to the I/O controller 535. The I/O controller 535 may be, for example, one or more buses or other wired or wireless connections, as are known in the art. The I/O controller 535 may have additional elements, which are omitted for simplicity, such as controllers, buffers (caches), drivers, repeaters, and receivers, to enable communications.

The I/O devices 540, 545 may further include devices that communicate both inputs and outputs, for instance disk and tape storage, a network interface card (NIC) or modulator/demodulator (for accessing other files, devices, systems, or a network), a radio frequency (RF) or other transceiver, a telephonic interface, a bridge, a router, and the like.

The processor 505 is a hardware device for executing hardware instructions or software, particularly those stored in memory 510. The processor 505 may be a custom made or commercially available processor, a central processing unit (CPU), an auxiliary processor among several processors associated with the computing device 500, a semiconductor based microprocessor (in the form of a microchip or chip set), a macroprocessor, or other device for executing instructions. The processor 505 includes a cache 570, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 570 may be organized as a hierarchy of more cache levels (L1, L2, etc.).

The memory 510 may include one or combinations of volatile memory elements (e.g., random access memory, RAM, such as DRAM, SRAM, SDRAM, etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 510 may incorporate electronic, magnetic, optical, or other types of storage media. Note that the memory 510 may have a distributed architecture, where various components are situated remote from one another but may be accessed by the processor 505.

The instructions in memory 510 may include one or more separate programs, each of which comprises an ordered listing of executable instructions for implementing logical functions. In the example of FIG. 5, the instructions in the memory 510 include a suitable operating system (OS) 511. The operating system 511 essentially may control the execution of other computer programs and provides scheduling, input-output control, file and data management, memory management, and communication control and related services. The instructions in the memory also include instructions for implementing embodiments of the analysis engine 202 described herein.

Additional data, including, for example, instructions for the processor 505 or other retrievable information, may be stored in storage 520, which may be a storage device such as a hard disk drive or solid state drive. The stored instructions in memory 510 or in storage 520 may include those enabling the processor to execute one or more aspects of the systems and methods of this disclosure.

The computing device 500 may further include a display controller 525 coupled to a display 530. In some embodiments, the computing device 500 may further include a network interface 560 for coupling to a network 565. The network 565 may be an IP-based network for communication between the computing device 500 and an external server, client and the like via a broadband connection. The network 565 transmits and receives data between the computing device 500 and external systems. In some embodiments, the network 565 may be a managed IP network administered by a service provider. The network 565 may be implemented in a wireless fashion, e.g., using wireless protocols and technologies, such as WiFi, WiMax, etc. The network 565 may also be a packet-switched network such as a local area network, wide area network, metropolitan area network, the Internet, or other similar type of network environment. The network 565 may be a fixed wireless network, a wireless local area network (LAN), a wireless wide area network (WAN) a personal area network (PAN), a virtual private network (VPN), intranet or other suitable network system and may include equipment for receiving and transmitting signals.

Systems and methods according to this disclosure may be embodied, in whole or in part, in computer program products or in computing device 500, such as that illustrated in FIG. 5.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
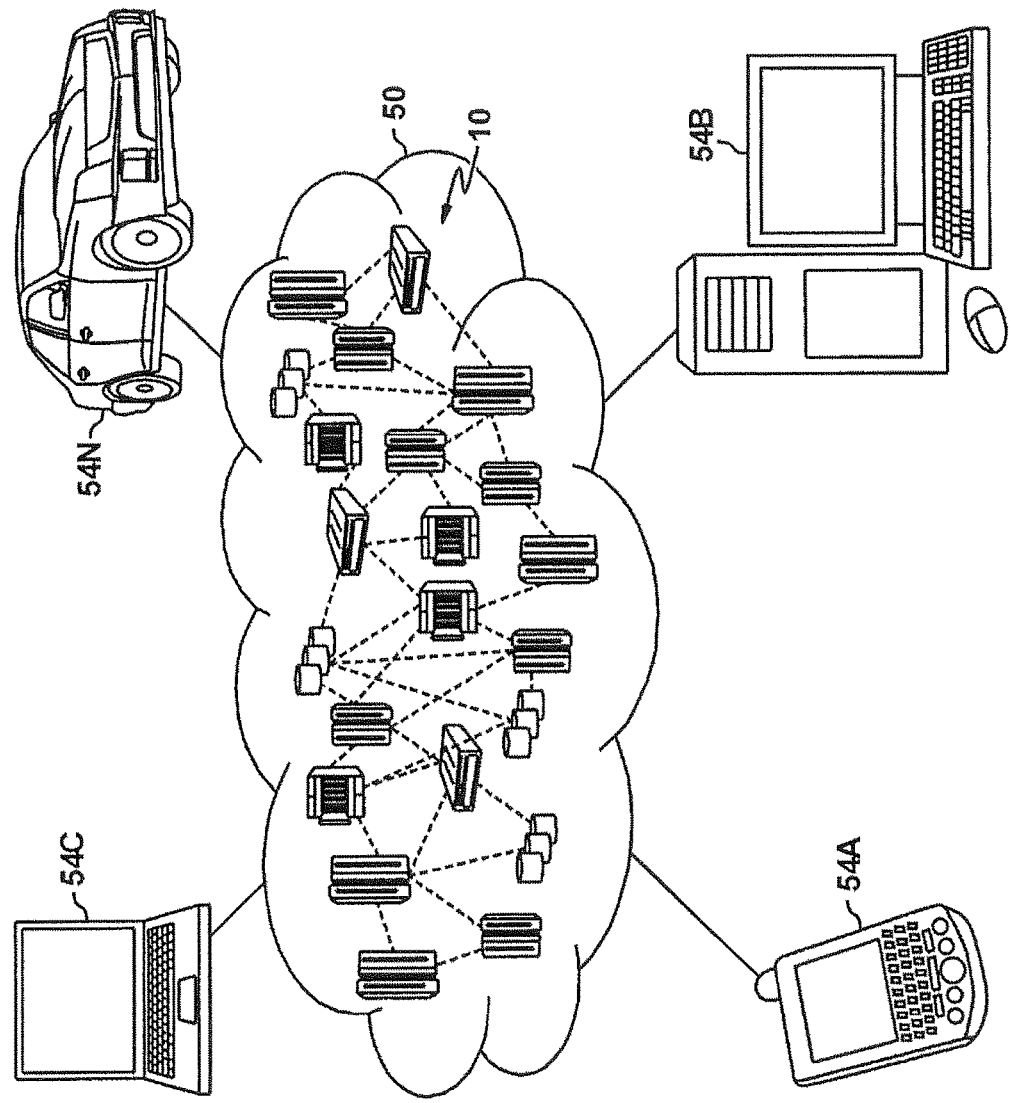
FIG. 6 depicts a cloud computing environment according to some embodiment of this disclosure.

Referring now to FIG. 6, illustrative cloud computing environment 350 is depicted. As shown, cloud computing environment 350 comprises one or more cloud computing nodes 352 with which local computing devices used by cloud consumers, such as, for example, personal digital assistant (PDA) or cellular telephone 354A, desktop computer 354B, laptop computer 354C, and/or automobile computer system 354N may communicate. Nodes 352 may communicate with one another. They may be grouped (not shown) physically or virtually, in one or more networks, such as Private, Community, Public, or Hybrid clouds as described hereinabove, or a combination thereof. This allows cloud computing environment 350 to offer infrastructure, platforms and/or software as services for which a cloud consumer does not need to maintain resources on a local computing device. It is understood that the types of computing devices 354A-N shown in FIG. 6 are intended to be illustrative only and that computing nodes 352 and cloud computing environment 350 can communicate with any type of computerized device over any type of network and/or network addressable connection (e.g., using a web browser).

Figure 7:
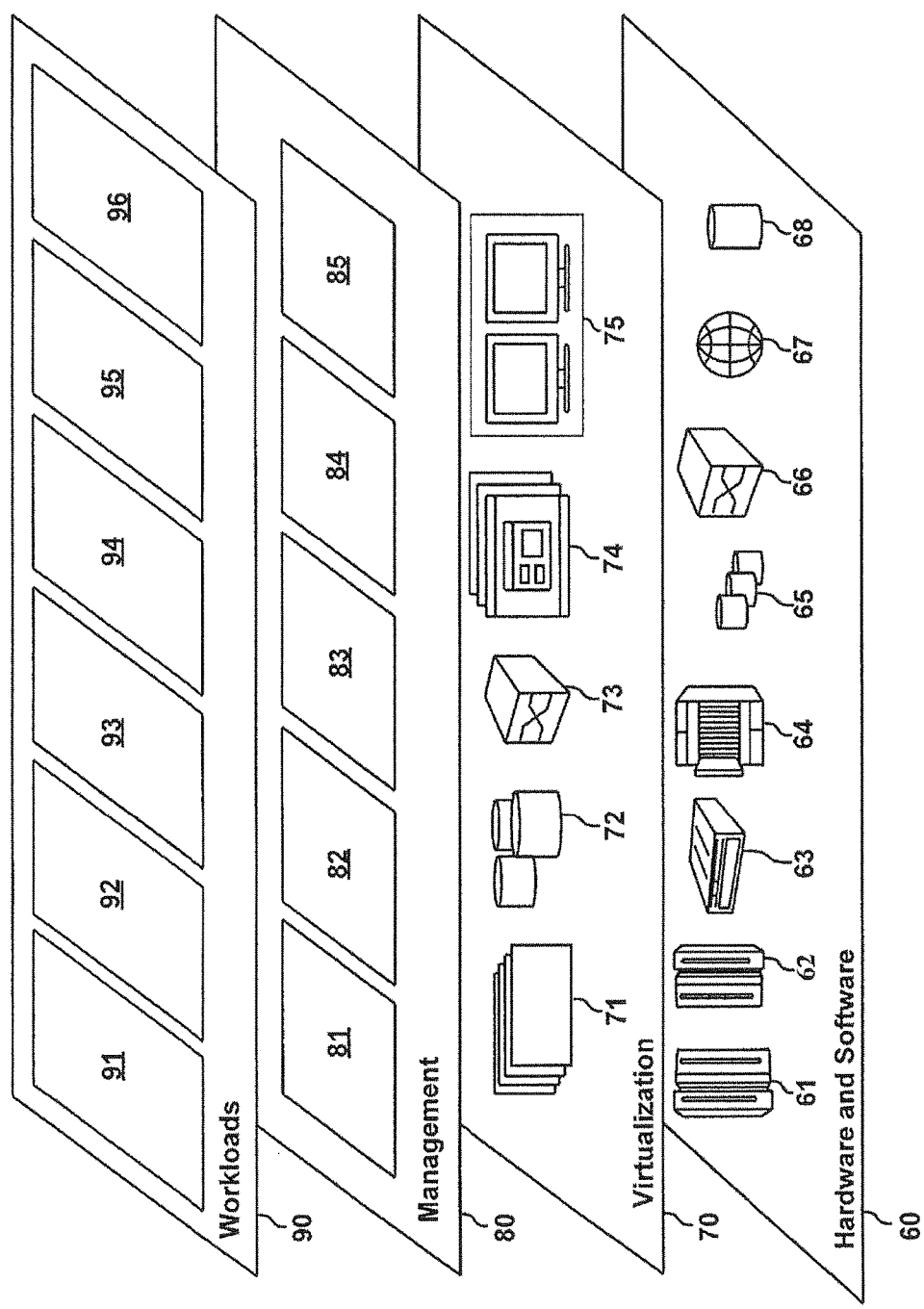
FIG. 7 depicts abstraction model layers according to some embodiments of this disclosure.

Referring now to FIG. 7, a set of functional abstraction layers provided by cloud computing environment 350 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 360 includes hardware and software components. Examples of hardware components include: mainframes 361; RISC (Reduced Instruction Set Computer) architecture based servers 362; servers 363; blade servers 364; storage devices 365; and networks and networking components 366. In some embodiments, software components include network application server software 367 and database software 368.

Virtualization layer 370 provides an abstraction layer from which the following examples of virtual entities may be provided: virtual servers 371; virtual storage 372; virtual networks 373, including virtual private networks; virtual applications and operating systems 374; and virtual clients 375.

In one example, management layer 380 may provide the functions described below. Resource provisioning 381 provides dynamic procurement of computing resources and other resources that are utilized to perform tasks within the cloud computing environment. Metering and Pricing 382 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 383 provides access to the cloud computing environment for consumers and system administrators. Service level management 384 provides cloud computing resource allocation and management such that required service levels are met. Service Level Agreement (SLA) planning and fulfillment 385 provides pre-arrangement for, and procurement of, cloud computing resources for which a future requirement is anticipated in accordance with an SLA.

Workloads layer 390 provides examples of functionality for which the cloud computing environment may be utilized. Examples of workloads and functions which may be provided from this layer include: mapping and navigation 391; software development and lifecycle management 392; virtual classroom education delivery 393; data analytics processing 394; transaction processing 395; and an image processing and object location processing 396. The software development and lifecycle management 392 may perform one or more methods that allow automatically expiring out source code comments to operate, such as but not limited to the methods described in reference to FIGS. 1-4 for example.

Technical effects and benefits include the ability to provide recursive analysis of ETL job flows (data lineage) and real-time sensitive source data alerts to determine whether or not an ETL job submission will lead to potential sensitive data leakage. This can reduce the chance that sensitive data will be leaked to unauthorized users. In addition, embodiments provide users with information about what is needed to remedy the flow and sources to allow the ETL job to run without leading to data leakage.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
   detecting, by an analysis engine, that an extract transform load (ETL) job in an ETL system has been submitted for execution, the ETL job including an input data storage location and an output data storage location;
   analyzing, by the analysis engine, the ETL job to predict whether execution of the ETL job will result in sensitive information being made accessible to an unauthorized user, the analyzing based on a sensitivity status of contents of the input data storage location and a data lineage of contents of the output data storage location;
   preventing, by the analysis engine, the ETL job from executing based on predicting that execution of the ETL job will result in sensitive information being made accessible to an unauthorized user; and
   initiating execution of the ETL job based on predicting that execution of the ETL job will not result in sensitive information being made accessible to an unauthorized user,
   wherein the predicting includes a recursive or iterative process of tracing data of the output data storage location through subsequent ETL jobs in the ETL system.

2. The method of claim 1, wherein the input data storage location includes data that is classified as sensitive data and the method further comprises:
   generating a report that indicates a flow of the data that is classified as sensitive data through ETL jobs defined in the ETL system.

3. The method of claim 1, wherein the sensitivity status is received in real-time in response to a request from the analysis engine.

4. The method of claim 3, wherein the sensitivity status is received from one or more of a database activity monitoring system and a file activity monitoring system.

5. The method of claim 1, wherein the data lineage is contained in a data lineage report that is generated based on one or more of a planned data flow, a design time data flow, and a run-time data flow in the ETL system.

6. The method of claim 1, wherein the data lineage of contents of the output data storage location is located in a report that was generated by a data lineage tool based on a flow of ETL jobs in the ETL system.

7. The method of claim 1, further comprising:
   subsequent to the initiating execution of the ETL job, receiving, by the analysis engine, a sensitivity status change alert; and
   halting execution of the ETL job based on the receiving.

8. The method of claim 1, wherein inputs at the input data storage location do not contain sensitive data and the analysis engine predicts that execution of the ETL job will result in sensitive information being made accessible to an unauthorized user.

9. A system comprising:
   a memory having computer readable instructions; and
   one or more processors for executing the computer readable instructions, the computer readable instructions comprising:
   detecting, by an analysis engine, that an extract transform load (ETL) job in an ETL system has been submitted for execution, the ETL job including an input data storage location and an output data storage location;
   analyzing, by the analysis engine, the ETL job to predict whether execution of the ETL job will result in sensitive information being made accessible to an unauthorized user, the analyzing based on a sensitivity status of contents of the input data storage location and a data lineage of contents of the output data storage location;
   preventing, by the analysis engine, the ETL job from executing based on predicting that execution of the ETL job will result in sensitive information being made accessible to an unauthorized user; and
   initiating execution of the ETL job based on predicting that execution of the ETL job will not result in sensitive information being made accessible to an unauthorized user,
   wherein the predicting includes a recursive or iterative process of tracing data of the output data storage location through subsequent ETL jobs in the ETL system.

10. The system of claim 9, wherein the input data storage location includes data that is classified as sensitive data and the instructions further comprise:
   generating a report that indicates a flow of the data that is classified as sensitive data through ETL jobs defined in the ETL system.

11. The system of claim 9, wherein the sensitivity status is received in real-time in response to a request from the analysis engine.

12. The system of claim 9, wherein the sensitivity status is received from one or more of a database activity monitoring system and a file activity monitoring system.

13. The system of claim 9, wherein the data lineage is contained in a data lineage report that is generated based on one or more of a planned data flow, a design time data flow, and a run-time data flow in the ETL system.

14. The system of claim 9, wherein the data lineage of contents of the output data storage location is located in a report that was generated by a data lineage tool based on a flow of ETL jobs in the ETL system.

15. A computer program product comprising a non-transitory computer readable storage medium having program instructions embodied therewith, the program instructions executable by a processor to cause the processor to perform:
  detecting that an extract transform load (ETL) job in an ETL system has been submitted for execution, the ETL job including an input data storage location and an output data storage location;
  analyzing the ETL job to predict whether execution of the ETL job will result in sensitive information being made accessible to an unauthorized user, the analyzing based on a sensitivity status of contents of the input data storage location and a data lineage of contents of the output data storage location;
  preventing the ETL job from executing based on predicting that execution of the ETL job will result in sensitive information being made accessible to an unauthorized user; and
  initiating execution of the ETL job based on predicting that execution of the ETL job will not result in sensitive information being made accessible to an unauthorized user,
  wherein the predicting includes a recursive or iterative process of tracing data of the output data storage location through subsequent ETL jobs in the ETL system.

16. The computer program product of claim 15, wherein the input data storage location includes data that is classified as sensitive data and the program instructions are further executable by the processor to cause the processor to perform:
  generating a report that indicates a flow of the data that is classified as sensitive data through ETL jobs defined in the ETL system.

17. The computer program product of claim 15, wherein the sensitivity status is received in real-time in response to a request from the analysis engine.

18. The computer program product of claim 15, wherein the sensitivity status is received from one or more of a database activity monitoring system and a file activity monitoring system.

* * * * *